(12) United States Patent
Jain et al.

(10) Patent No.: US 10,862,830 B2
(45) Date of Patent: Dec. 8, 2020

(54) REAL-TIME ON-CHIP DATA TRANSFER SYSTEM

(71) Applicant: NXP USA, INC., Austin, TX (US)

(72) Inventors: Naveen Kumar Jain, Panipat (IN); Joachim Fader, Munich (DE); Shreya Singh, Ranchi (IN); Nishant Jain, Noida (IN); Anshul Goel, Uttar Pradesh (IN)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/222,671

(22) Filed: Dec. 17, 2018

(65) Prior Publication Data

US 2020/0195589 A1 Jun. 18, 2020

(51) Int. Cl.
| | |
|---|---|
| *H04J 3/24* | (2006.01) |
| *H04L 12/861* | (2013.01) |
| *H04L 7/033* | (2006.01) |
| *H04L 12/935* | (2013.01) |
| *H04L 12/939* | (2013.01) |
| *H04L 12/879* | (2013.01) |
| *H04N 5/067* | (2006.01) |

(52) U.S. Cl.
CPC ........ *H04L 49/9042* (2013.01); *H04L 7/0331* (2013.01); *H04L 49/3063* (2013.01); *H04L 49/552* (2013.01); *H04L 49/901* (2013.01); *H04N 5/067* (2013.01)

(58) Field of Classification Search
CPC . H04L 49/9042; H04L 49/901; H04L 7/0331; H04L 49/3063; H04L 49/552; H04N 5/067
USPC .......................................................... 370/474
See application file for complete search history.

(56) References Cited

U.S. PATENT DOCUMENTS

| | | | |
|---|---|---|---|
| 8,352,793 B2 | 1/2013 | Lee | |
| 9,977,477 B2 | 5/2018 | C. R. et al. | |
| 2009/0315899 A1* | 12/2009 | Pourbigharaz | ............ G06F 3/14 345/501 |
| 2017/0201746 A1* | 7/2017 | An | ........................ H04N 17/002 |

OTHER PUBLICATIONS

Abdennadher, S., "Practices in High-Speed IO Testing", 2016 21st IEEE European Test Symposium, as May 2016.
"MIPI Alliance Specification for M-PHY", XP009191893, Version 1.00.00, Feb. 8, 2011.

* cited by examiner

*Primary Examiner* — Mang Hang Yeung

(57) ABSTRACT

A system and method for real-time data transfer on a system-on-chip (SoC) allows MIPI-CSI (camera serial interface) data received on a first interface to be output on another MIPI-CSI interface without using system memory or delaying the loopback path. The system includes a CSI receiver, a loopback buffer, and a CSI transmitter. The loopback buffer is used for the data transfer between the CSI receiver and the CSI transmitter. The CSI transmitter receives a payload included in a data packet from the CSI receiver by way of the loopback buffer. The CSI receiver communicates a packet header of the data packet to the CSI transmitter. The CSI transmitter reads the payload from the loopback buffer based on the packet header and at least one of a buffer threshold capacity and payload size.

13 Claims, 13 Drawing Sheets

REAL-TIME ON-CHIP DATA TRANSFER SYSTEM

BACKGROUND

The present invention relates generally to system-on-chips (SoCs) with high-speed serial interfaces, and, more particularly, to a system for transferring data between two high speed serial interfaces on a SoC.

Many SoCs have two or more high-speed serial interfaces (HSSIs), and in certain scenarios, it is desirable to transfer data from the pads of one HSSI directly to the other HSSI. However, some standards, such as MIPI-CSI2 (Mobile Industry Processor Interface-Camera Serial Interface) standards do not allow pad to pad or traditional high-speed serial loopback methods. For such systems, if the received MIPI-CSI2 data is to be continuously monitored, the loopback path must have data tapped at locations different from the pad. Typically, to loopback the data, the data is tapped at the system memory, where it is stored for processing purposes. However, this requires a lot of system memory space and causes latencies due to additional system memory reads being performed to loopback the data.

For operations such as testing the SoC, data output from a DSI (Digital Serial Interface) is compared with data provided to a CSI. However, as the DSI output data is in DSI format and the CSI data is in CSI format, the DSI format data must be converted to the CSI format for comparison, which causes additional processing delay.

Accordingly, it would be advantageous to have a system capable of transferring or looping back data between two or more HSSIs in real-time that does not require system memory and does not introduce long delays.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
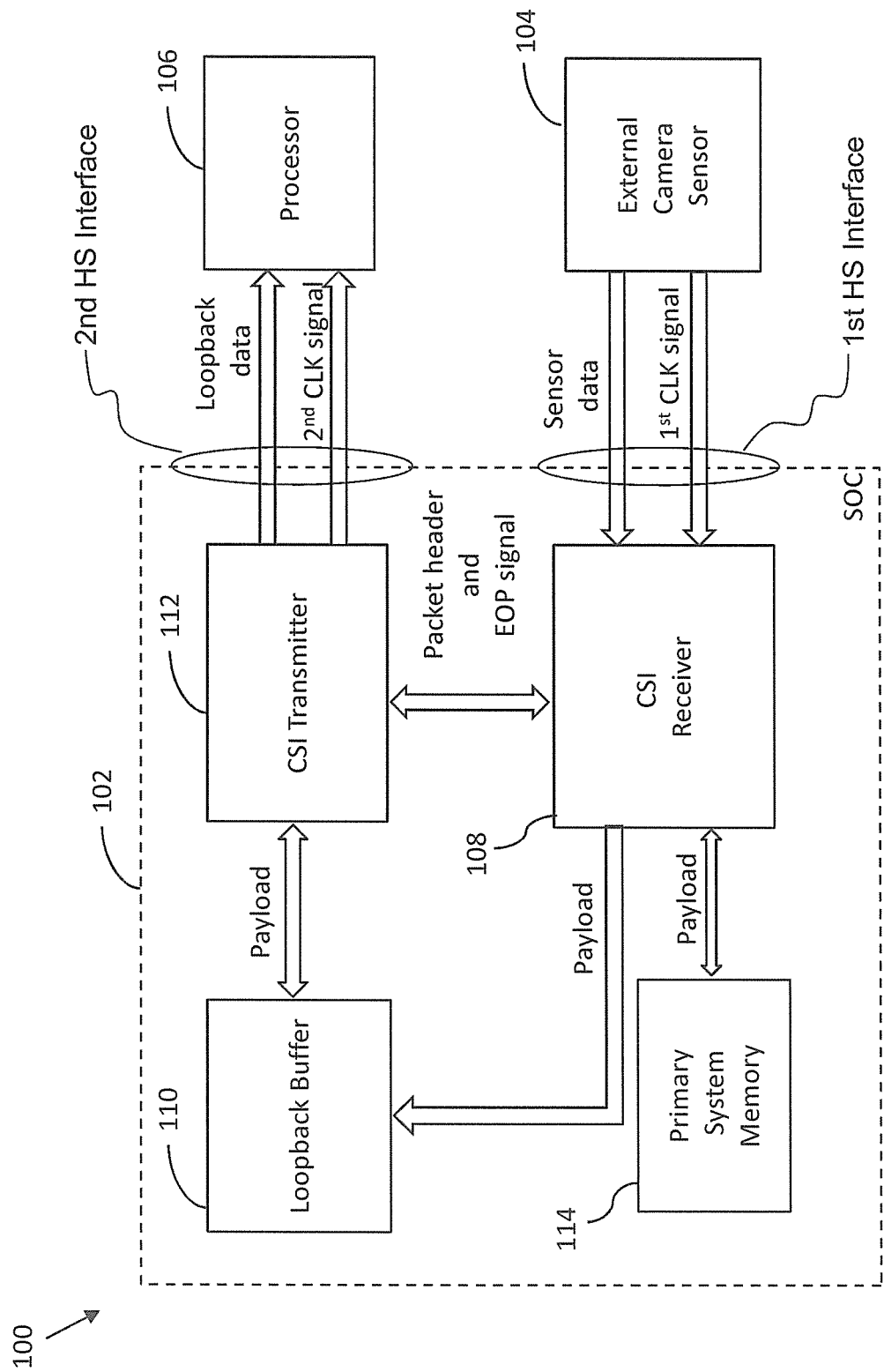
FIG. 1 is a block diagram of a system for data transfer in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention provides a system-on-chip (SoC) including a camera serial interface (CSI) receiver, a loopback buffer, and a CSI transmitter. The CSI receiver receives sensor data and generates a data packet that includes a payload. The loopback buffer is connected to the CSI receiver. The CSI receiver writes the payload into the loopback buffer. The CSI transmitter is connected to the loopback buffer for reading the payload. The CSI transmitter reads the payload when at least one of a threshold capacity of the loopback buffer is reached and the payload is received completely by the loopback buffer.

In another embodiment, the present invention provides a method for data transfer in a system-on-chip (SoC), where the SoC includes a CSI receiver, a loopback buffer, and a CSI transmitter. The method includes generating a data packet that includes a payload and writing the payload to the loopback buffer. The method further includes reading the payload from the loopback buffer when at least one of a threshold capacity of the loopback buffer is reached and the payload is received completely by the loopback buffer.

In yet another embodiment, the present invention provides a system-on-chip (SoC) that includes a CSI receiver, a loopback buffer, and a CSI transmitter. The CSI receiver receives sensor data and generates a data packet that includes a payload. The loopback buffer is connected to the CSI receiver. The CSI receiver writes the payload into the loopback buffer. The CSI transmitter is connected to the loopback buffer for reading the payload. The CSI transmitter generates loopback data and reads the payload when at least one of a threshold capacity of the loopback buffer is reached and the payload is received completely by the loopback buffer. A format of the loopback data is the same as a format of the sensor data.

Various embodiments of the present invention provide a method and system for transferring data between two high-speed serial interfaces (HSSI) in a SoC without using system memory. The SoC includes a CSI receiver connected to one HSSI, a loopback buffer, and a CSI transmitter connected to another HSSI. The CSI receiver receives raw sensor data from the first HSSI and generates a data packet including a header and a payload. The CSI receiver then writes the payload of the data packet into the loopback buffer. The CSI transmitter reads the payload from the loopback buffer when at least one of the threshold capacity is reached and the payload is received completely by the loopback buffer. The CSI transmitter also generates loopback data based on the amount of payload data read by the CSI transmitter. The sensor data and the loopback data both have the same format.

The method and system eliminate the need to use system memory for data transfers between two HSSI. Further, as the loopback data and the sensor data have the same format, there is no need to convert the format of the loopback data to the format of the sensor data.

Referring now to FIG. 1, a block diagram of a system for data transfer 100 (hereinafter referred to as "system 100"), in accordance with an embodiment of the present invention is shown. The system 100 may be implemented in integrated circuits like SoCs and used for automotive applications such as a connected car, consumer applications such as a home security system, or industrial applications such as an industrial robotics. The system 100 includes a system-on-chip (SoC) 102 connected to an external camera sensor 104 and a processor 106. In one embodiment, the system 100 acts as a measurement interface, and in another embodiment, the system 100 acts as a repeater interface. Although the processor 106 is shown as being external to the SoC 102, in other embodiments, the processor 106 is included in the SoC 102.

The external camera sensor 104 captures an image or a video and outputs raw sensor data in a camera serial interface (CSI) format. The external camera sensor 104 further outputs a first clock signal at a first frequency for synchronizing the transmission frequency of the sensor data with the first frequency.

The sensor data is received by the SOC 102 in real-time via a first high-speed serial interface (HSSI). The sensor data is processed by the SoC 102 to generate loopback data, which is in the same format as that of the sensor data (i.e., in the CSI format). The SoC 102 generates a second clock signal at a second frequency for synchronizing the transmission frequency of the loopback data with the second frequency. In a preferred embodiment, the second frequency is equal to the first frequency. The loopback data is then output at the second frequency over a second HSSI by the SoC 102. The signals and data that are received and generated by the SoC 102 are further shown in the timing diagram of FIG. 9.

The SoC 102 includes a CSI receiver 108, a loopback buffer 110, a CSI transmitter 112, and a primary system memory 114. In one embodiment, the CSI receiver 108 is a CSI-2 interface defined by the Mobile Industry Processor Interface (MIPI) protocol. The CSI-2 interface supports low power (LP) and high speed (HS) signaling modes. The CSI receiver 108 is connected to the external camera sensor 104 via the first HSSI (i.e., MIPI-CSI2) to receive the sensor data and the first clock signal. The CSI receiver 108 generates a data packet from the sensor data. The data packet may be a short or long packet type.

The data packet includes a packet header, a payload and, for a long type packet, a packet footer. The packet header includes a data identifier (ID), a word count (WC), and an error correction code (ECC). The WC specifies a size of the payload. The ID includes a virtual channel identifier (VC) and a data type (DT) value. The VC specifies a virtual channel over which the sensor data is received. The DT value specifies a format of the payload and the type of the data packet. The packet footer includes a checksum of the payload, which is used for correcting cyclic redundancy check (CRC) errors. The CSI receiver 108 separates the packet header and the payload and outputs the packet header and the payload. When the data packet is a short packet, the data packet includes the packet header.

In a presently preferred embodiment, the loopback buffer 110 is a dual-port first-in first-out (FIFO) memory. The loopback buffer 110 is connected to the CSI receiver 108 to receive the payload by way of a write interface and buffers or stores the payload for a short period of time.

A depth of the loopback buffer 110 is based on various delays in the system 100 such as the time required to write the payload into the loopback buffer 110 and the time required to read the payload from the loopback buffer 110.

The depth of the loopback buffer 110 also is based on a delay in handling HS signaling and delays in clock uncertainties of the CSI receiver 108 and the CSI transmitter 112. A threshold capacity of the loopback buffer 110 is based on the depth of the loopback buffer 110. The threshold capacity is the point to which the buffer may be filled without causing an overflow. In the presently preferred embodiment, the buffer 110 has a threshold capacity such that an overflow of the payload is avoided while the loopback buffer 110 is receiving the payload.

The CSI transmitter 112 is connected to the CSI receiver 108 by way of a command FIFO read interface, which allows the transmitter 112 to read the packet header from the receiver 108. The CSI transmitter 112 also is connected to the loopback buffer 110 by way of a read interface.

The CSI transmitter 112 identifies the size of the payload using the packet header. Based on the identified size, the CSI transmitter 112 determines whether the size of the payload is equal to the buffer threshold capacity by comparing the identified size with an amount of the payload stored in the loopback buffer 110. To determine the amount of the payload stored in the loopback buffer 110, the CSI transmitter 112 checks addresses that are pointed to by a read pointer and a write pointer of the loopback buffer 110. The addresses pointed to are used to determine the amount of the payload stored in the loopback buffer 110. The CSI transmitter 112 reads the payload from the loopback buffer 110 when at least one of the size of the payload equals the threshold capacity (i.e., if the threshold capacity of the loopback buffer 110 is reached) and the size of the payload equals the amount of the payload stored in the loopback buffer 110 (i.e., if the loopback buffer 110 has received the entire payload).

The CSI transmitter 112 regenerates the data packet by combining the packet header and the payload. The CSI transmitter 112 then generates the loopback data and the second clock signal based on the data packet. The loopback data is transmitted at the second clock frequency to components (such as the processor 106) by way of the second HSSI. Thus, using the receiver 108, buffer 110 and transmitter 112, the SoC 102 is able to receive data from one HSSI and output the data over a second HSSI without using the system memory 114.

The primary system memory 114 is a main memory of the SoC 102. The primary system memory 114 is connected to the CSI receiver 108 to receive the payload. The payload is thus stored in the system memory 114 and may be used when a display operation to display video or image data is performed. In accordance with the present invention, the system 100 does not use the system memory 114 to transfer data between either the CSI receiver 108 and the CSI transmitter 112, or the first and second HSSIs.

The processor 106 is connected to the SoC 102 to receive the loopback data and the second clock signal. In one embodiment, the processor 106 is used to test the SoC 102 by comparing the sensor data and the loopback data to determine whether the sensor data matches the loopback data. If the loopback data does not match the sensor data, the processor 106 indicates that the SoC 102 may have a fault. If the loopback data matches the sensor data, the processor 106 determines that the SoC 102 is functioning correctly.

Figure 2:
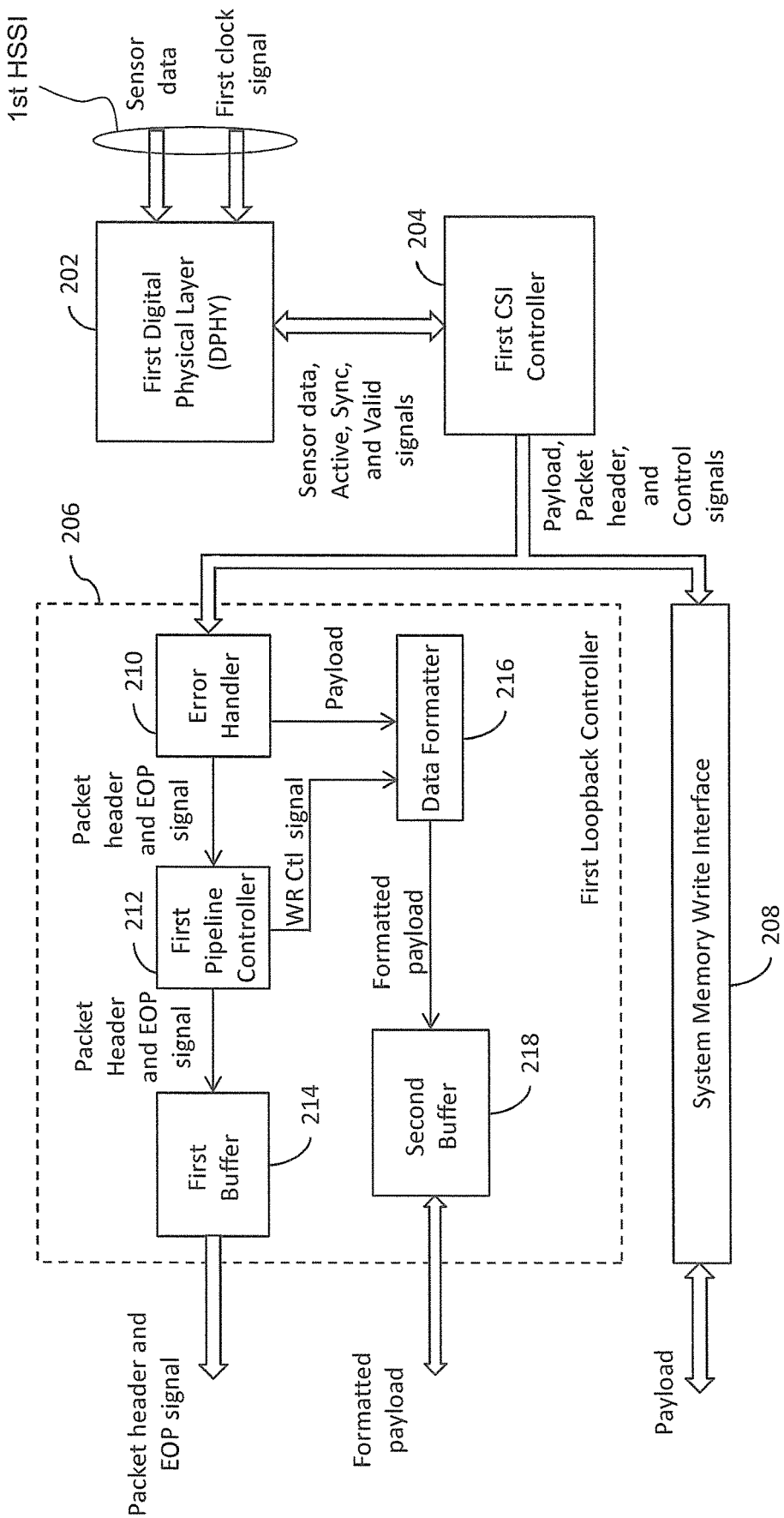
FIG. 2 is a block diagram of an embodiment of a camera serial interface (CSI) receiver of the system of FIG. 1.

Referring now to FIG. 2, a block diagram of the CSI receiver 108, in accordance with an embodiment of the present invention, is shown. The CSI receiver 108 includes a first digital physical layer (DPHY) 202, a first CSI controller 204, a first loopback controller 206, and a system memory write interface 208.

The first DPHY 202 is connected to the first HSSI and operates in accordance with the MIPI protocol. The first DPHY 202 may include multiple DPHY masters or multiple DPHY slaves that enable the first DPHY 202 to operate in a master or slave mode. In one embodiment of the present invention, the first DPHY 202 operates in the slave mode.

The first DPHY 202 is connected to the external camera sensor 104 for receiving the first clock signal by way of a first clock lane of an interface. The first clock lane includes positive and negative clock lines. The first DPHY 202 further receives the sensor data from the external camera sensor 104 by way of multiple data lanes. Each data lane includes a positive data line ($D_P$) and a negative data line ($D_N$). During HS signaling mode, each data lane carries a corresponding part of the sensor data at a high data rate (such as 2.5 gigabit per second (Gbps)) and is driven by a low-swing differential signal. In the LP signaling mode, each data lane carries signals at a low data rate (such as 10 megabits per second (Mbps)). It will be understood by those of skill in the art that a data lane that has a positive line and a negative line means refers to a differential signal.

The first DPHY 202 generates an active signal when it is ready for transmission of the sensor data, and a sync signal to synchronize the sensor data transmission frequency with the first frequency. The first DPHY 202 further determines whether the sensor data is valid, i.e., the first DPHY 202 determines whether the received sensor data is in the CSI format. On determining that the sensor data is valid, the first DPHY 202 generates a valid signal (e.g., at a logic high state). In one embodiment, if the sensor data received by the first DPHY 202 is invalid, the first DPHY 202 generates the valid signal at logic low state and transmits the low valid signal to the first CSI controller 204.

The first CSI controller 204 is connected to the first DPHY 202 to receive the sensor data in a byte format by way of multiple data lanes of a first PHY protocol interface (PPI). The first CSI controller 204 further receives active, sync, and valid signals from the first DPHY 202. The first CSI controller 204 unpacks each byte of the sensor data into pixels to generate the data packet.

To determine whether the data packet includes any errors, the first CSI controller 204 performs error correction on the data packet and generates an error signal. In one embodiment, the first CSI controller 204 detects errors (such as an ECC error, CRC error, or a high-speed exit error) in the data packet and activates the error signal. If the data packet is error free, then the CSI controller 204 does not activate the error signal. The first CSI controller 204 further generates a header valid signal that indicates whether the packet header is valid (i.e., the packet header is error-free). Similarly, the first CSI controller 204 generates a data valid signal when it determines that the payload is valid (i.e., the payload is error-free). The first CSI controller 204 generates an SOP signal and an EOP signal, which indicate a start of the data packet and an end of the data packet, respectively. The error signal, the header valid signal, the data valid signal, the SOP signal, and the EOP signal are control signals generated by the first CSI controller 204. The first CSI controller 204 separates and outputs the packet header and the payload of the data packet.

The first loopback controller 206 is connected to the first CSI controller 204 to receive the packet header, the payload, and the control signals. In a presently preferred embodiment, the first loopback controller 206 includes an error handler 210, a first pipeline controller 212, a first buffer 214, a data formatter 216, and a second buffer 218.

The error handler 210 is connected to the first CSI controller 204 to receive the packet header, the payload, and the control signals. The error handler 210 receives the data packet based on the SOP signal. The error signal, the header valid signal, and the data valid signal are used to indicate an erroneous data packet, an invalid header, and an invalid payload, respectively, in which case the error handler 210 discards the data packet. The error handler 210 may further generate default data based on the data packet to maintain continuity of data flow. If no error is indicated, then the error handler 210 outputs the packet header, the payload, and the EOP signal.

The first pipeline controller 212 is connected to the error handler 210 to receive the packet header and the EOP signal. Based on the packet header, the first pipeline controller 212 decodes the data packet type, such a long or short packet. The first pipeline controller 212 identifies a format of the payload from the packet header. For a long packet type and based on the identified format, the first pipeline controller 212 will generate a write control signal.

The first buffer 214 is connected to the first pipeline controller 212, which writes the packet header and the EOP signal to the first buffer 214. In the presently preferred embodiment, the first buffer 214 is a FIFO memory that buffers (i.e., stores) the packet header for a short period of time. The CSI transmitter 112 reads the packet header and the EOP signal from the first buffer 214.

The data formatter 216 is connected to the error handler 210 to receive the payload. The data formatter 216 also is connected to the first pipeline controller 212 to receive the write control signal. If the first pipeline controller 212 identifies the packet as a long type packet, then the first pipeline controller 212 writes the packet header into the first buffer 214 and transmits the write control signal to the data formatter 216.

The data formatter 216 includes a FIFO buffer (not shown) that temporarily stores the payload data. The data formatter 216 further receives the write control signal, which indicates an amount of the payload to be packed by the data formatter 216. The amount of the payload to be packed is based on the format of the payload. For example, if the payload is RGB format, then the amount of the payload to be packed is 1 byte. In another example, if the payload is a RAW format, then the amount of the payload to be packed is 3 bytes. The data formatter 216 thus packs (i.e., compresses) the payload to generate a formatted payload.

The second buffer 218 preferably comprises a FIFO memory that is used to buffer the formatted payload data. The second buffer 218 is connected to the data formatter 216 to receive the formatted payload data. The second buffer 218 writes the formatted payload data into the loopback buffer 110.

The system memory write interface 208 is connected to the first CSI controller 204 to receive the packet header, the payload, and the control signals. The system memory write interface 208 writes the payload into the primary system memory 114, based on the error signal. If the error signal indicates that there is an error in the data packet, then the system memory write interface 208 may discard the payload. If the error signal indicates that the data packet is error-free, then the system memory write interface 208 writes the payload into the primary system memory 114.

Figure 3:
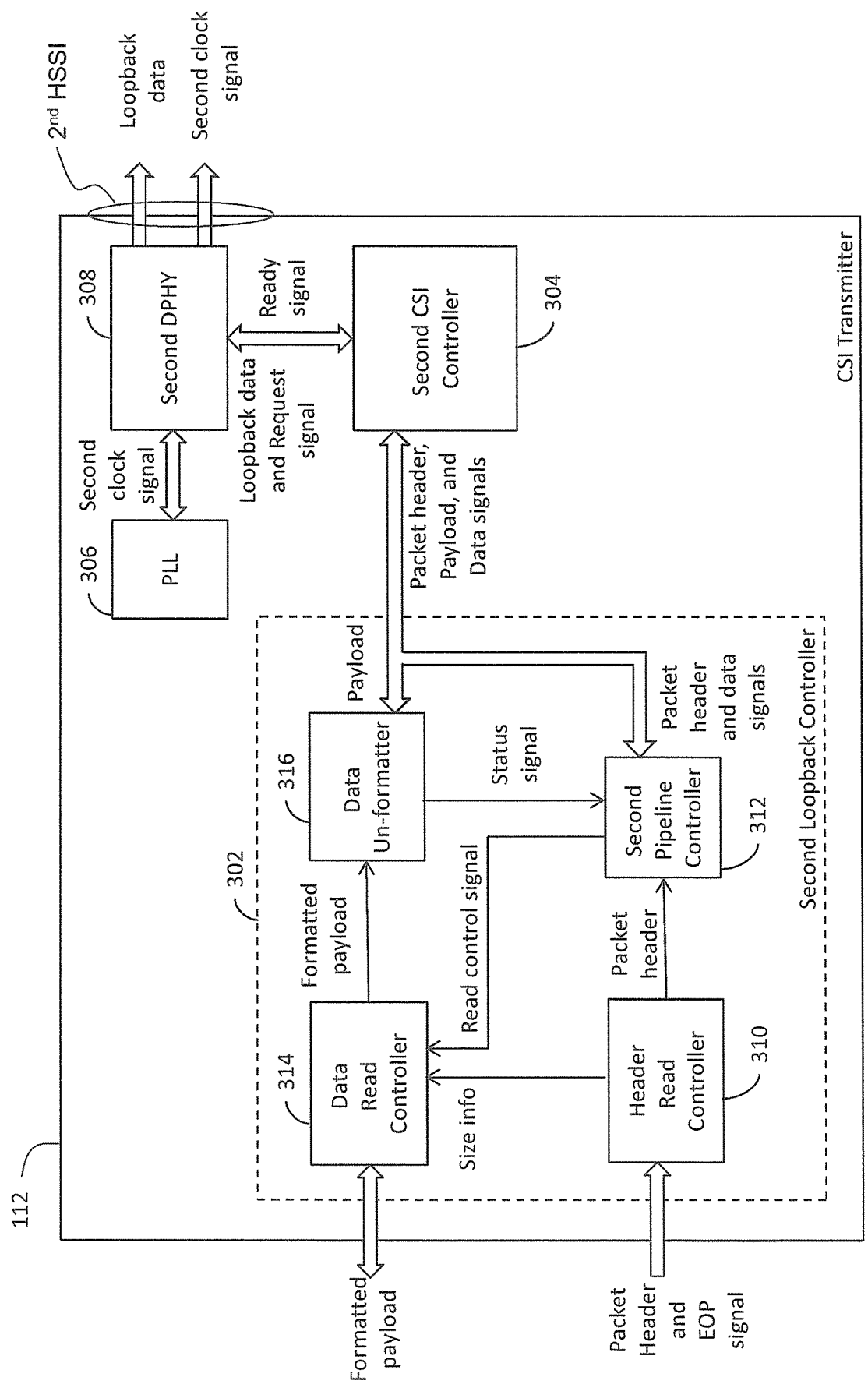
FIG. 3 is a block diagram of an embodiment of a CSI transmitter of the system of FIG. 1.

Referring now to FIG. 3, a block diagram of the CSI transmitter 112, in accordance with an embodiment of the present invention, is shown. The CSI transmitter 112 includes a second loopback controller 302, a second CSI controller 304, a phase locked loop (PLL) 306, and a second DPHY 308.

The second loopback controller 302 is connected to the loopback buffer 110 to receive the formatted payload data. The second loopback controller 302 also is connected to the first loopback controller 206 for reading the packet header. The first loopback controller 206 further communicates the EOP signal to the second loopback controller 302. The second loopback controller 302 includes a header read controller 310, a second pipeline controller 312, a data read controller 314, and a data un-formatter 316.

The header read controller 310 is connected to the first buffer 214 to read the packet header and receive the EOP signal. Based on the packet header, the header read controller 310 identifies the size of the payload. The header read controller 310 outputs the packet header and payload size information.

The second pipeline controller 312 is connected to the header read controller 310 to receive the packet header. The second pipeline controller 312 identifies the format of the payload from the packet header and generates a read control signal. The read control signal indicates an amount of the formatted payload to be read by the data read controller 314. For example, if the payload is in RGB format, then the amount of the formatted payload to be read is 1 byte. In another example, if the payload is in RAW format, then the amount of the formatted payload to be read is 3 bytes.

The data read controller 314 is connected to the header read controller 310 and the second pipeline controller 312 to receive the size information and the read control signal, respectively. The data read controller 314 also is connected to the loopback buffer 110 to read the formatted payload based on the size information and the read control signal. The data read controller 314 reads the formatted payload from the loopback buffer 110 when the data read controller 314 determines that the size of the formatted payload stored in the loopback buffer 110 equals the size of the payload identified from the size information or equals the threshold capacity of the loopback buffer 110.

The data un-formatter 316 is connected to the data read controller 314 to receive the formatted payload data. The data un-formatter 316 includes a second FIFO memory (not shown) for buffering the formatted payload data. The data un-formatter 316 unpacks, i.e., decompresses the formatted payload data to regenerate the payload data. When the amount of the formatted payload data buffered by the second FIFO is less than a threshold capacity of the second FIFO, the data un-formatter 316 generates a status signal.

The second pipeline controller 312 also is connected to the data un-formatter 316 to receive the status signal. Based on the value of the status signal, the second pipeline controller 312 generates the read control signal for the data read controller 314 to avoid an underflow of the formatted payload in the second FIFO.

The second CSI controller 304 is connected to the data un-formatter 316 and the second pipeline controller 312 to receive the payload and the packet header, respectively. The second CSI controller 304 combines the packet header and the payload to re-generate the data packet. The second CSI controller 304 also packs (i.e., converts) the payload data of the regenerated data packet (which is in a pixel format to a byte format) to generate the loopback data.

The transmission of the packet header and the payload between the second loopback controller 302 and the second CSI controller 304 is based on data signals such as a command request signal, a command acknowledgement signal, a read signal, and a read enable signal. The packet header of a short packet may include a command such as a frame start command or a frame end command. The frame start command indicates a start of an image frame of a video that includes multiple data packets. The frame end command indicates an end of the image frame of the video.

The second pipeline controller 312 generates the command request signal to request transmission of the command and provides the command request signal to the second CSI controller 304. In response to the command request signal, the second CSI controller 304 generates a command acknowledgement signal, which indicates that the second CSI controller 304 is ready to receive the command. The second pipeline controller 312 also generates read enable and read enable last signals. The read enable signal indicates transmission of the payload by the second loopback controller 302 to the second CSI controller 304 and the read enable last signal indicates transmission of a last byte of the payload by the second loopback controller 302 to the second pipeline controller 312.

The second DPHY 308 is connected to the second HSSI and operates according to the MIPI protocol. The second DPHY 308 may include multiple DPHY masters or multiple DPHY slaves that enable the first DPHY 202 to operate in a master or slave mode. In one embodiment, the first DPHY 202 operates in the master mode.

The second DPHY 308 is connected to the PLL 306 and the second CSI controller 304 to receive the second clock signal and the request signal, respectively. The second CSI controller 304 generates the request signal for requesting high speed transmission of the loopback data. The second CSI controller 304 provides the request signal to the first DPHY over a second PPI. In response to the request signal, the second DPHY 308 generates a ready signal and transmits the ready signal to the second CSI controller 304 when the second DPHY 308 is ready for high speed transmission of the loopback. In response to the ready signal, the second CSI controller 304 transmits the loopback data to the second DPHY 308 over the second PPI. The second DPHY 308 thus receives the loopback data and transmits the loopback data at a high speed.

The second DPHY 308 transmits the second clock signal and the loopback data over a second clock lane and multiple data lanes to the processor 106, respectively. The second clock lane includes positive and negative clock lines. Further, each data lane includes positive and negative data lines (i.e., for differential signaling).

Figure 4:
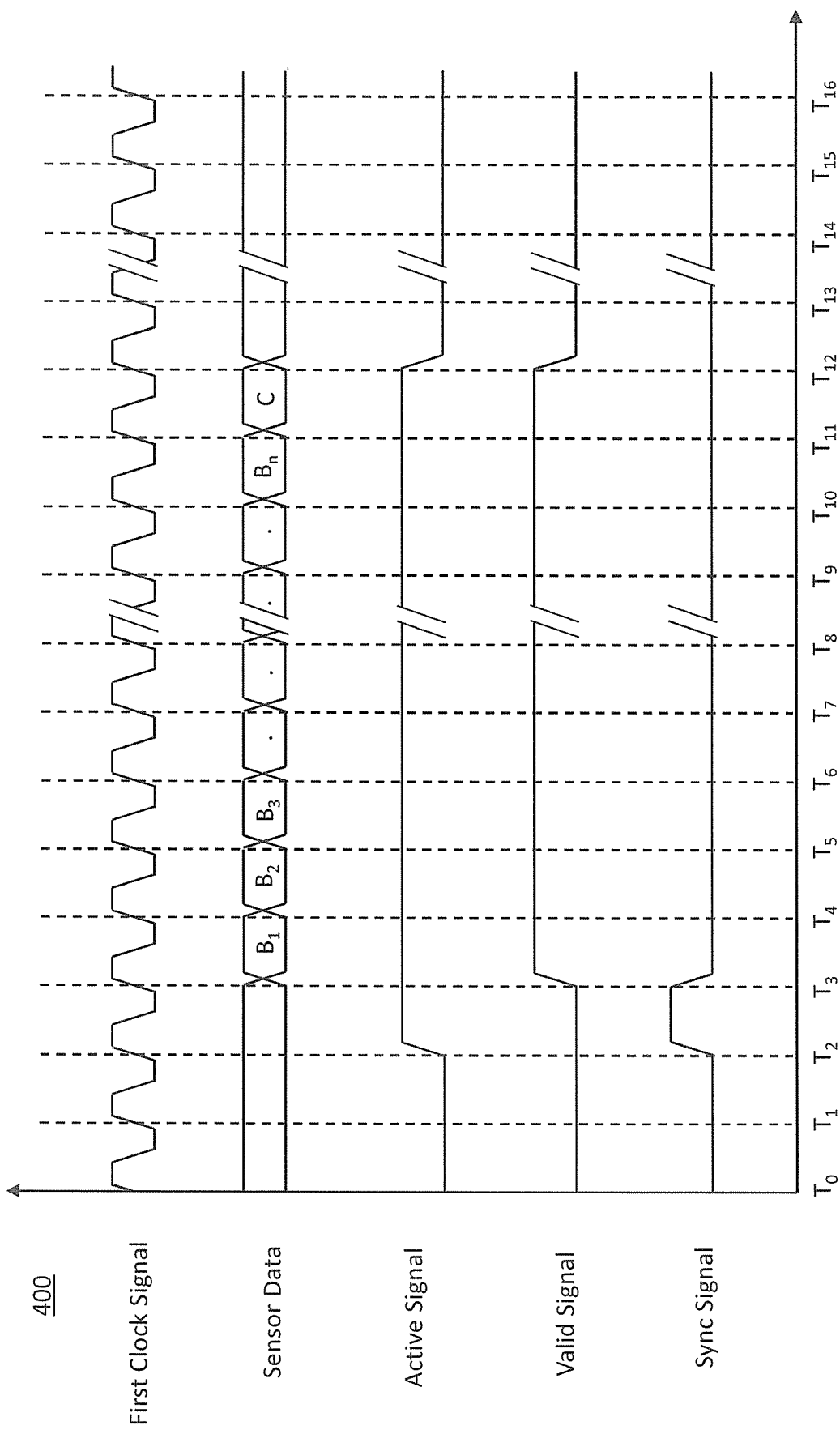
FIG. 4 is a timing diagram illustrating an operation of a first DPHY of the CSI receiver of FIG. 2 in accordance with an embodiment of the present invention.

Referring now to FIG. 4, a timing diagram 400 illustrating an operation of the first DPHY 202, in accordance with an embodiment of the present invention is shown.

From time $T_0$-$T_2$, the active, valid, and sync signals are at logic low state.

From time $T_2$-$T_3$, the first DPHY 202 generates the active signal (e.g., at logic high state) when the first DPHY 202 is ready for transmission of the sensor data. The first DPHY 202 also generates the sync signal (e.g., at logic high state) for synchronizing the frequency of transmission of the sensor data with the first frequency. The valid signal remains low.

From time $T_3$-$T_4$, the sync signal transitions from high to low. The active signal remains high and the first DPHY 202 initiates the transmission of the sensor data to the first CSI controller 204. The first DPHY 202 generates the valid signal (e.g., at logic high state). The first CSI controller 204 receives a first data byte 'B1' of the sensor data from the first DPHY 202.

From time $T_4$-$T_{12}$, the active signal and the valid signal remain high. Thus, the first DPHY 202 transmits the remaining data bytes 'B$_2$-C' of the sensor data to the first CSI controller 204.

From time $T_{12}$-$T_{13}$, the active and valid signals transition from high to low.

From time $T_{12}$-$T_{16}$, the active, valid, and sync signals continue to remain low.

Figure 5:
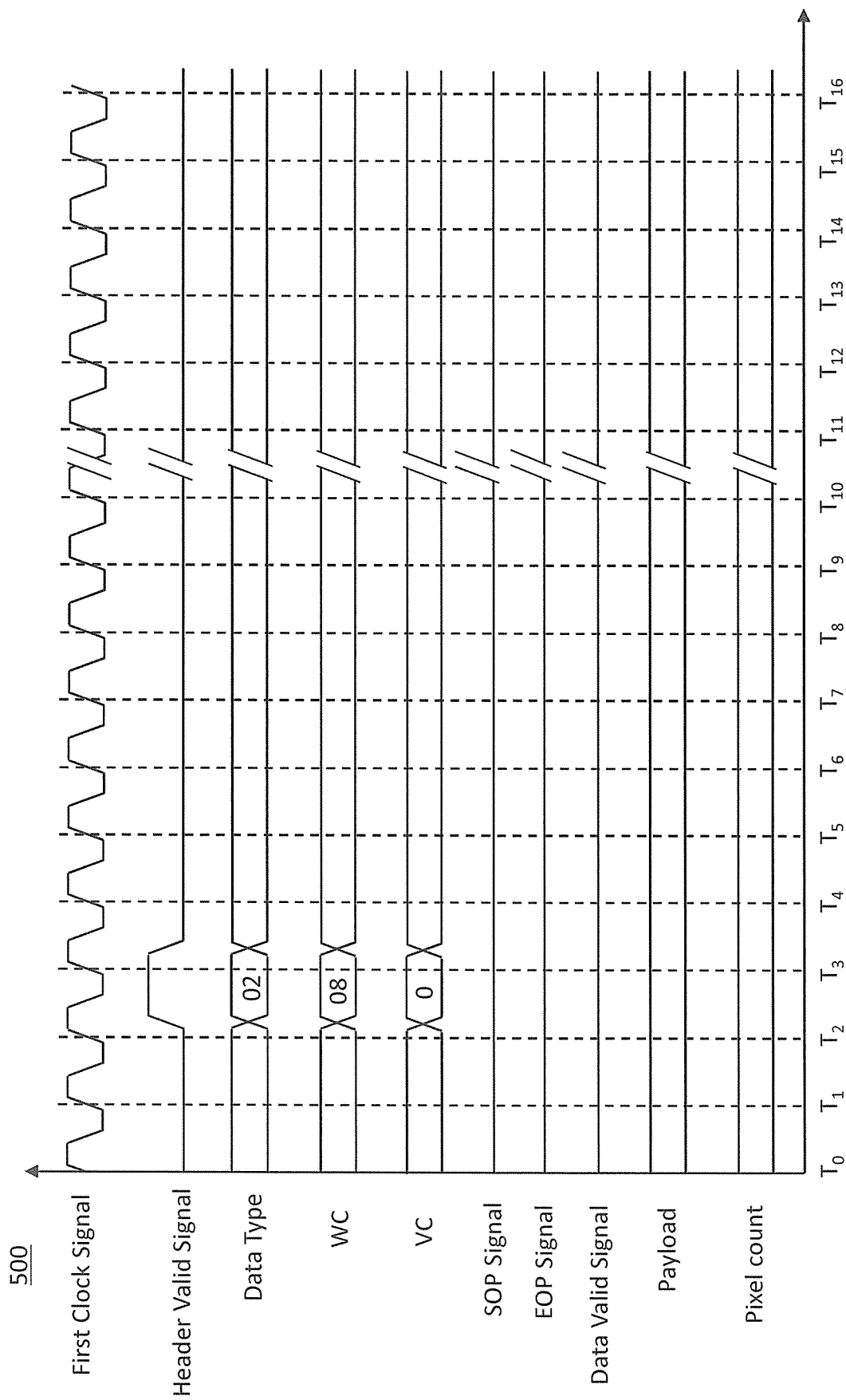
FIG. 5 is a timing diagram illustrating an operation of a first CSI controller of the CSI receiver of FIG. 2 in accordance with an embodiment of the present invention.

Referring now to FIG. 5, a timing diagram 500 illustrating an operation of the first CSI controller 204, in accordance with an embodiment of the present invention, is shown.

From time $T_0$-$T_2$, the header valid signal is at logic low state. The SOP, EOP, and data valid signals also are at logic low state. Further, a number of pixels in the payload are specified by a pixel count. From time $T_2$-$T_3$, the header valid signal transitions from low to high. The first CSI controller 204 transmits the packet header to the first loopback controller 206. The first CSI controller 204 further communicates the DT, WC, and VC corresponding to the data packet. For example, the DT may be 02, the WC may be 08, and the VC may be 0.

From time $T_2$-14, the header valid signal transitions from high to low. The SOP, EOP, and data valid signals remain low. Further, the error handler 210 receives the DT, WC, and VC.

From time $T_4$-$T_{16}$, the header valid, SOP, EOP, and data valid signals remain low.

Figure 6:
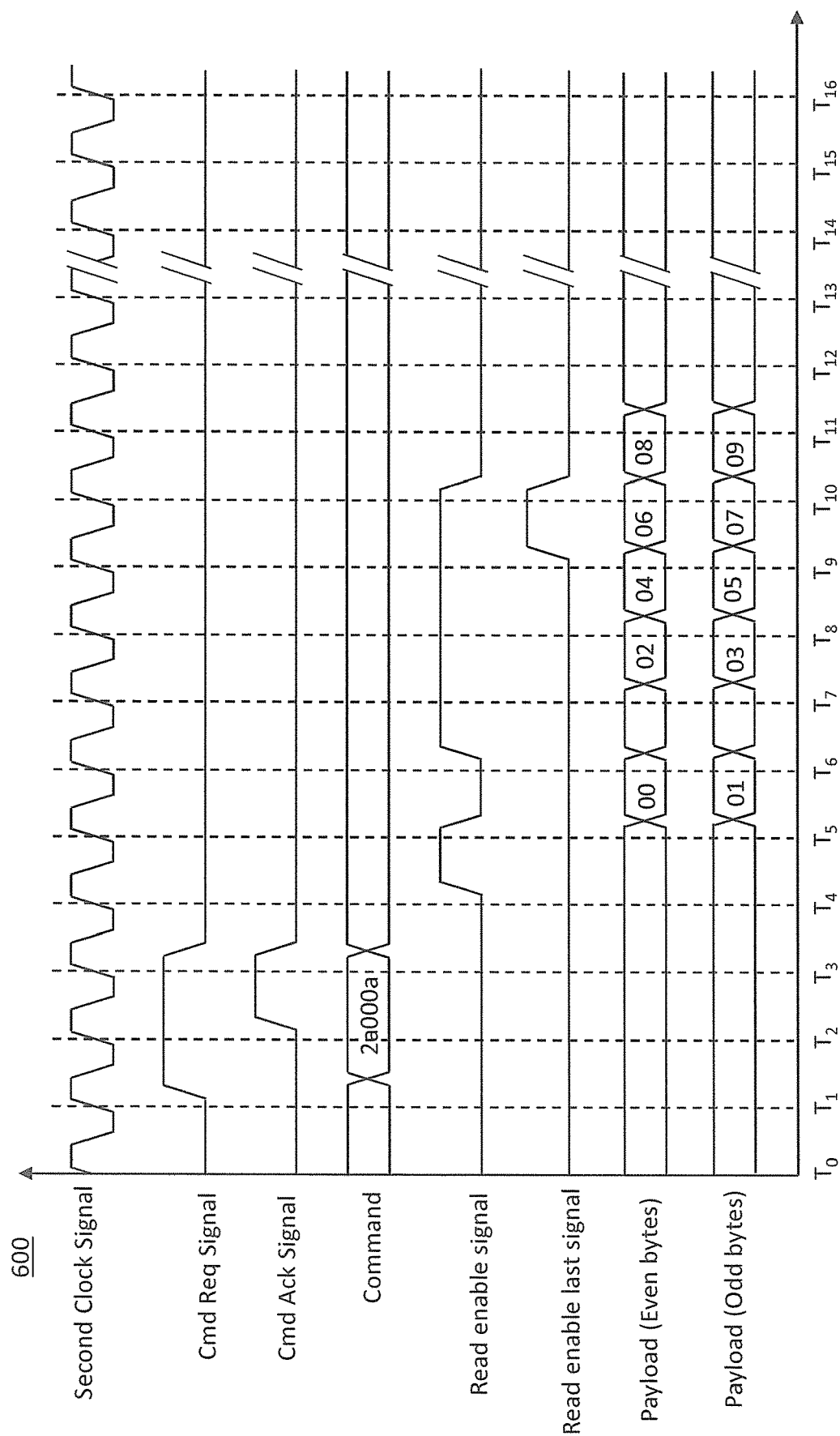
FIG. 6 is a timing diagram illustrating an operation of a second CSI controller of the CSI transmitter of FIG. 3 in accordance with an embodiment of the present invention.

Referring now to FIG. 6, a timing diagram 600 illustrating an operation of the second CSI controller 304, in accordance with an embodiment of the present invention, is shown.

From time $T_0$-$T_1$, the command request and command acknowledgement signals are at logic low state. The read enable and read enable last signals also are at logic low state.

From time $T_1$-$T_2$, the second CSI controller 304 receives the command request signal, which is at logic high state, and the transmission of the command by the second pipeline controller 312 to the second CSI controller 304 is initiated.

From time $T_2$-$T_3$, the command acknowledgement signal transitions from low to high. Thus, the second CSI controller 304 receives the command 2a000a.

From time $T_3$-14, the command request and command acknowledgement signals transition from high to low.

From time $T_4$-$T_5$, the read enable signal transitions from low to high.

From time $T_5$-$T_6$, the second CSI controller 304 receives a first even byte, such as 00, and a first odd byte, such as 01, of the payload. The read enable signal transitions from high to low.

From time $T_6$-$T_7$, the read enable signal transitions from low to high.

From time $T_7$-$T_9$, the read enable signal remains at logic high state. The second CSI controller 304 receives second and third even bytes, such as 02 and 04, and second and third odd bytes, such as 03 and 05, of the payload.

From time $T_9$-$T_{10}$, the read enable signal remains at logic high state and the read enable last signal transitions from low to high. The second CSI controller 304 receives a fourth even byte, such as 06, and a fourth odd byte, such as 07, of the payload.

From time $T_{10}$-$T_{11}$, the second CSI controller 304 receives a last even byte of the payload such as 08, and a last odd byte, such as 09, of the payload. The read enable and read enable last signals transition from high to low.

From time $T_{11}$-$T_{16}$, the command request, command acknowledgement, read enable, and read enable last signals remain low.

Figure 7:
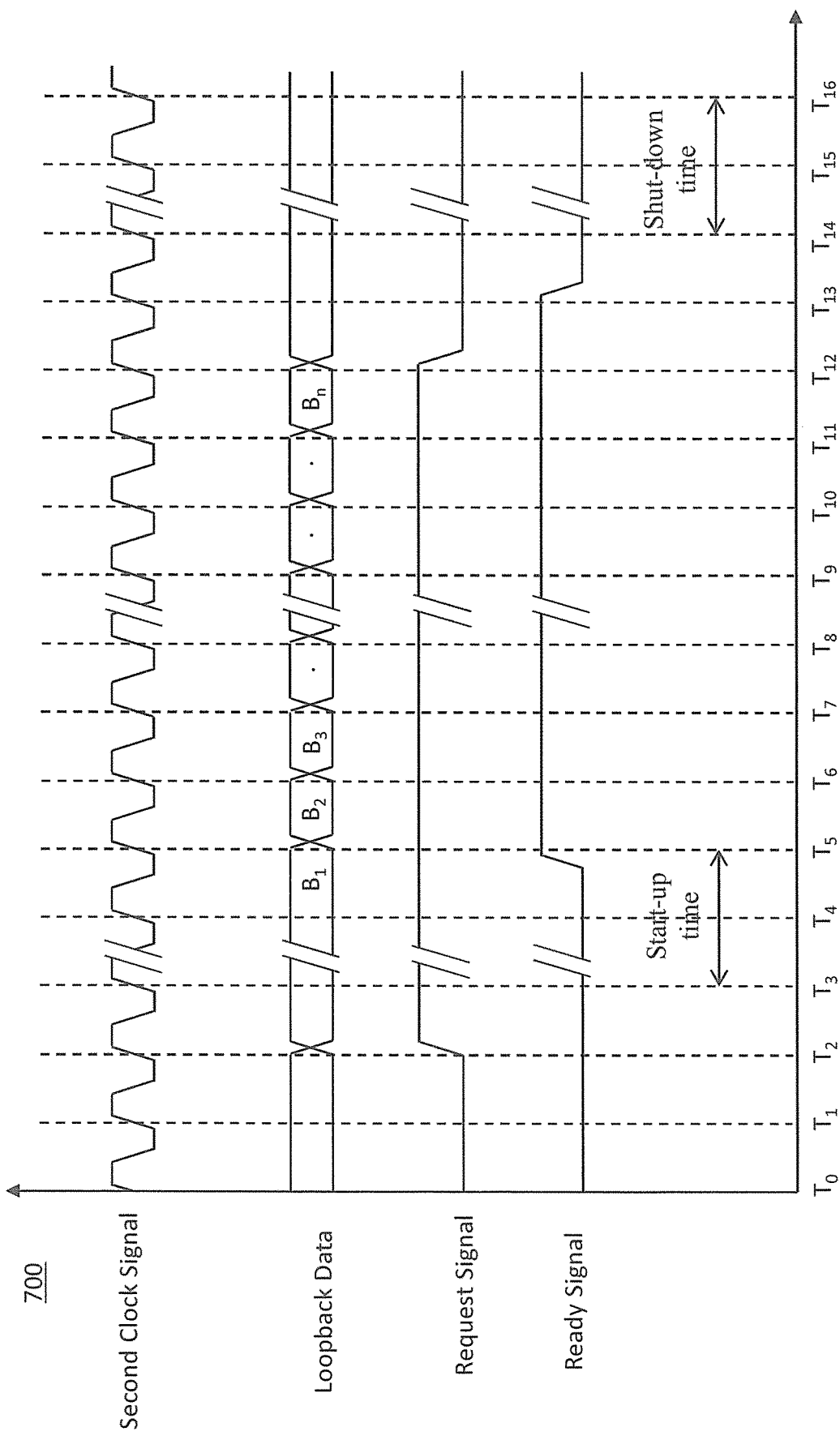
FIG. 7 is a timing diagram illustrating an operation of a second DPHY of the CSI transmitter of FIG. 3 in accordance with an embodiment of the present invention.

Referring now to FIG. 7, a timing diagram 700 illustrating an operation of the second DPHY 308, in accordance with an embodiment of the present invention, is shown.

From time $T_0$-$T_2$, the request and ready signals are at logic low state.

From time $T_2$-$T_3$, the second CSI controller 304 generates the request signal (e.g., at logic high state) for high speed transmission of the loopback data. The second DPHY 308 receives the request signal and the second CSI controller 304 initiates transmission of a first data byte 'B$_1$' to the second DPHY 308.

From time $T_3$-$T_4$, the request signal remains high and the ready signal remains low. The time period $T_3$-$T_5$, i.e., start-up time, is a time duration between the reception of the request signal and generation of the ready signal by the second CSI controller 304.

From time $T_4$-$T_5$, the second DPHY 308 generates the ready signal in response to the request signal. The second DPHY 308 receives the first data byte 'B$_1$' of the loopback data from the second CSI controller 304.

From time $T_5$-$T_{12}$, the request signal and the ready signal remain high. Thus, the second DPHY 308 receives the remaining data bytes 'B$_2$-B$_n$' of the loopback data from the second CSI controller 304.

From time $T_{12}$-$T_{13}$, the request signal transitions from high to low and the ready signal remains at high.

From time $T_{13}$-$T_{14}$, the ready signal transitions from high to low as the request signal is low. The second DPHY 308 exits the high-speed transmission state.

From time $T_{14}$-$T_{16}$, the request signal and the ready signal remain low. The time from $T_{14}$-$T_{16}$, i.e., shut-down time, is the time required by the second CSI controller 304 to terminate the high-speed transmission state.

Figure 8:
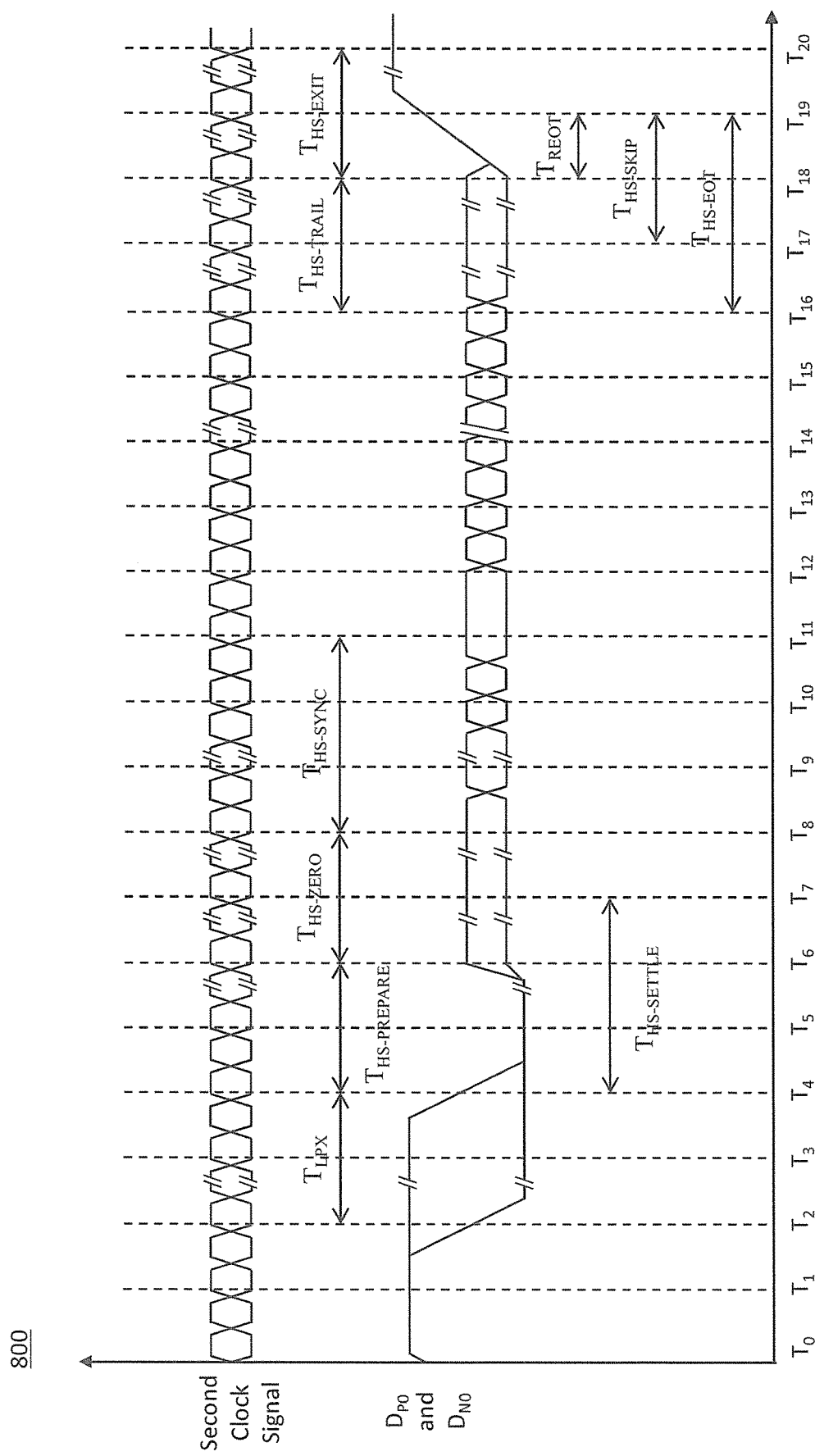
FIG. 8 is a timing diagram illustrating an operation of the CSI transmitter of FIG. 1 in accordance with an embodiment of the present invention.

Referring now to FIG. 8, a timing diagram 800 illustrating an operation of the CSI transmitter 112, in accordance with an embodiment of the present invention, is shown. A start-of-transmission (SOT) sequence as defined in the MIPI protocol is performed before initiating high speed transmission of data. The CSI transmitter 112 transitions from a stop state (LP-11) to a HS mode by way of the SOT sequence.

From time $T_0$-$T_1$, a first signal ($D_{P0}$) transmitted over $D_P$ is at logic high state and a second signal ($D_{N0}$) over $D_N$ is at logic high state. Thus, the CSI transmitter 112 is in the stop state (LP-11) of the SOT sequence.

From time $T_1$-$T_0$, $D_{P0}$ transitions from high to low and $D_{N0}$ remains at high. Thus, the CSI transmitter 112 is in a HS request state (LP-01) of the SOT sequence.

From time $T_0$-$T_1$, $D_{N0}$ transitions from high to low, whereas $D_{P0}$ remains low. Thus, the CSI transmitter 112 is in a HS prepare state (LP-00) of the SOT sequence. The time period $T_2$-$T_4$, i.e., TLPX, is the time required for initiating the HS request state.

From time $T_5$-$T_6$, the CSI transmitter 112 transitions from the LP mode to the HS mode. The time period $T_4$-$T_6$, i.e., $T_{HS\text{-}PREPARE}$, is the time required for initiating the HS prepare state.

From time $T_6$-$T_8$, the CSI transmitter 112 enters the high-speed mode of data transmission. The time period $T_6$-$T_8$, i.e., $T_{HS\text{-}ZERO}$, is the time required for initiating the HS-0 state of the SOT sequence. The time period $T_4$-$T_7$, i.e., $T_{HS\text{-}SETTLE}$, is the time period during which an HS receiver (not shown) in the processor 106 ignores any transitions of $D_{P0}$ and $D_{N0}$.

From time $T_8$-$T_{11}$, the CSI transmitter 112 transmits a synchronous code to synchronize the transmission frequency of high-speed data with the second frequency. The time period $T_8$-$T_{11}$, i.e., $T_{HS-SYNC}$, is the time required to transmit the synchronous code.

From time $T_{11}$-$T_{12}$, the CSI transmitter 112 transmits a first data byte of the loopback data. Thus, the CSI transmitter 112 initiates transmission of the loopback data.

From time $T_{12}$-$T_{16}$, the CSI transmitter 112 transmits the remaining data bytes of the loopback data.

From time $T_{16}$-$T_{18}$, the CSI transmitter 112 drives a flipped last data byte of the loopback data immediately after transmitting the last byte of the loopback data. The time period $T_{16}$-$T_{18}$, i.e., $T_{HS-TRAIL}$, is the time for which the CSI transmitter 112 drives the flipped last data byte of the loopback data.

From time $T_{18}$-$T_{20}$, the CSI transmitter 112 exits the HS mode and enters the stop state (LP-11). The time period $T_{18}$-$T_{20}$, i.e., $T_{HS-EXIT}$, is the time required for the CSI transmitter 112 to exit the HS mode. The time period $T_{16}$-$T_{19}$, i.e., $T_{HS-EOT}$, is the time required for the CSI transmitter 112 to initiate end-of-transmission sequence defined in the MIPI protocol. The time period $T_{18}$-$T_{19}$, i.e., $T_{REOT}$, is 30%-85% rise time of $D_{P0}$ or $D_{N0}$ in the LP signaling mode. The time period $T_{17}$-$T_{19}$, i.e., $T_{HS-SKIP}$, is the time period during which the HS receiver ignores any transitions of $D_{P0}$ and $D_{N0}$.

The delay in handling HS signaling is based on at least one of the $T_{HS-TRAIL}$ and the $T_{HS-EXIT}$, the start-up time, the shut-down time, and the time required to transition from the stop state to the HS request state. The delays in clock uncertainties of the CSI receiver 108 and the CSI transmitter 112 are based on parts-per-million (ppm) differences in the frequencies of the first and second clock signals. A delay in the logic pipeline and synchronization of the loopback data occurs due to the time required by the second CSI controller 304 to provide the request signal to the second DPHY 308, the time period between reception of the command request signal and the payload by the second CSI controller 304, and a time required to synchronize the loopback data. The depth of the loopback buffer 110 is determined based on the delays in handling HS signaling, clock uncertainties, and logic pipeline and synchronization of the loopback data at different data rates such as 2.5 Gbps or 10 Mbps.

Figure 9:
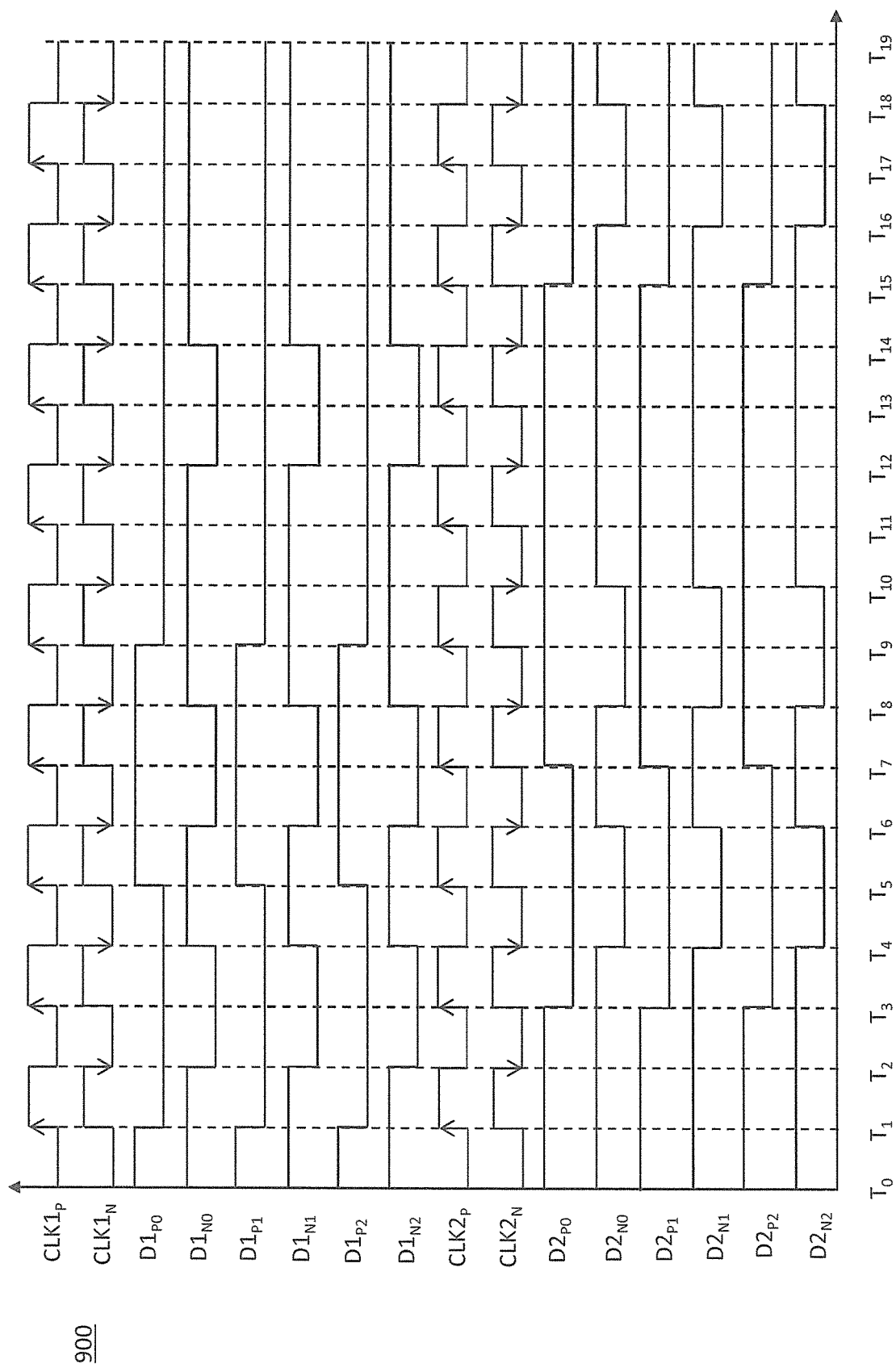
FIG. 9 is a timing diagram illustrating an operation of a SoC of FIG. 1 in accordance with an embodiment of the present invention.
Figure 10A:
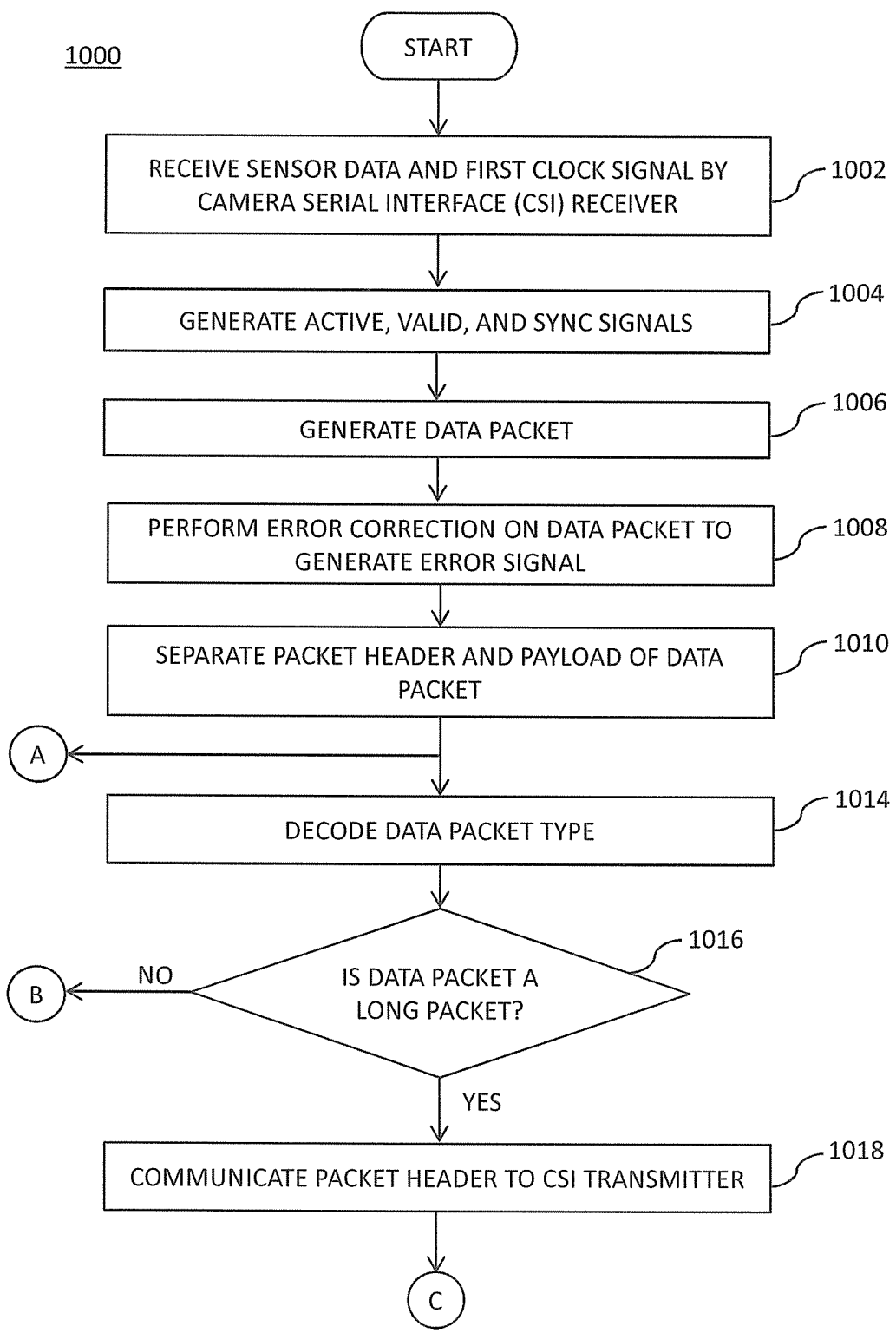
FIGS. 10A-10F are a flow chart illustrating a method for data transfer on the SoC of FIG. 1, in accordance with an embodiment of the present invention.
Figure 10B:
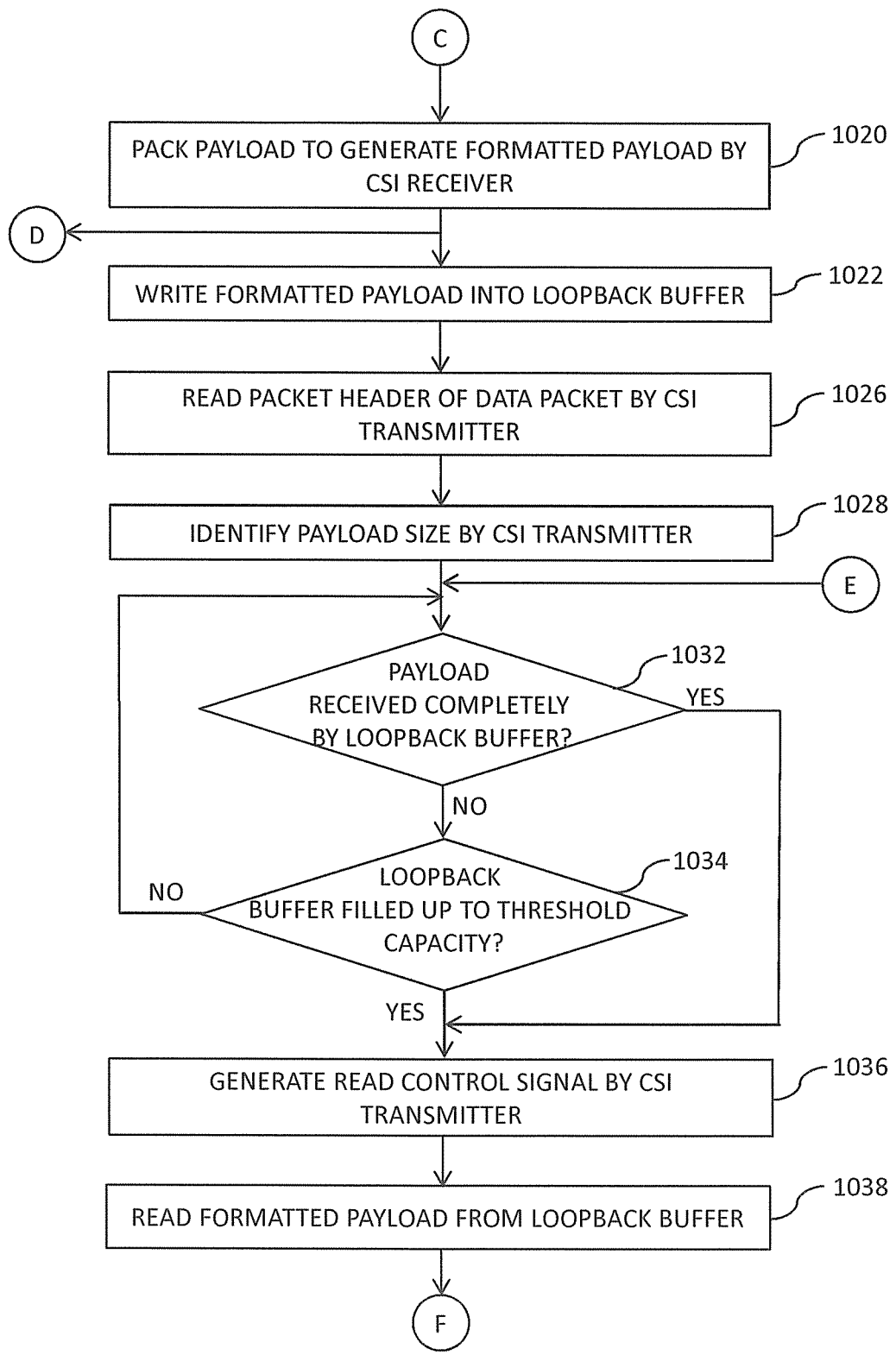
Figure 10C:
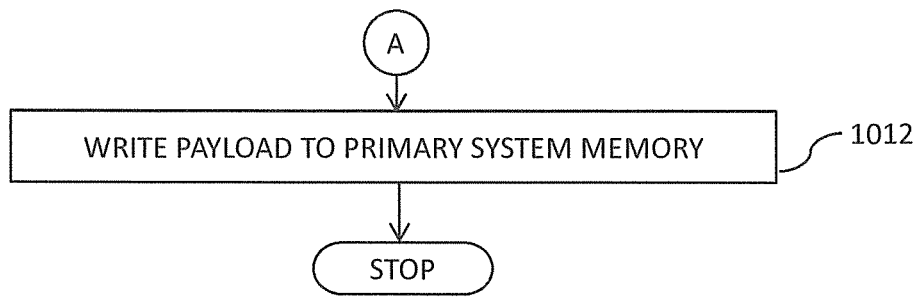
Figure 10D:
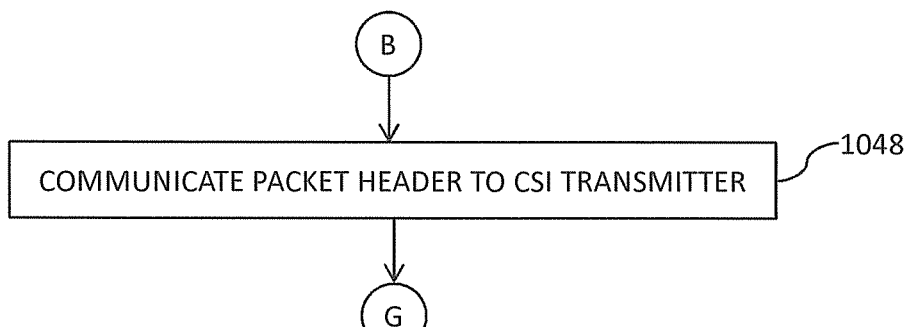
Figure 10E:
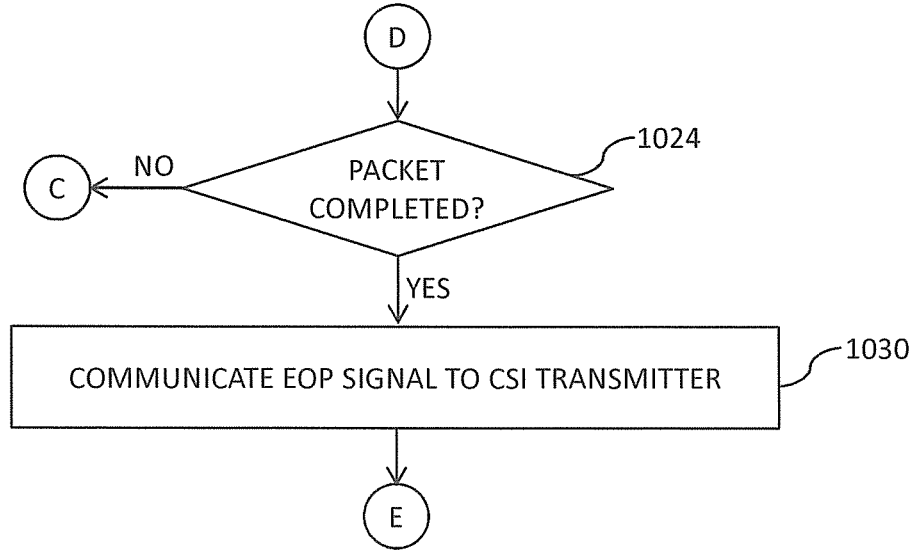
Figure 10F:
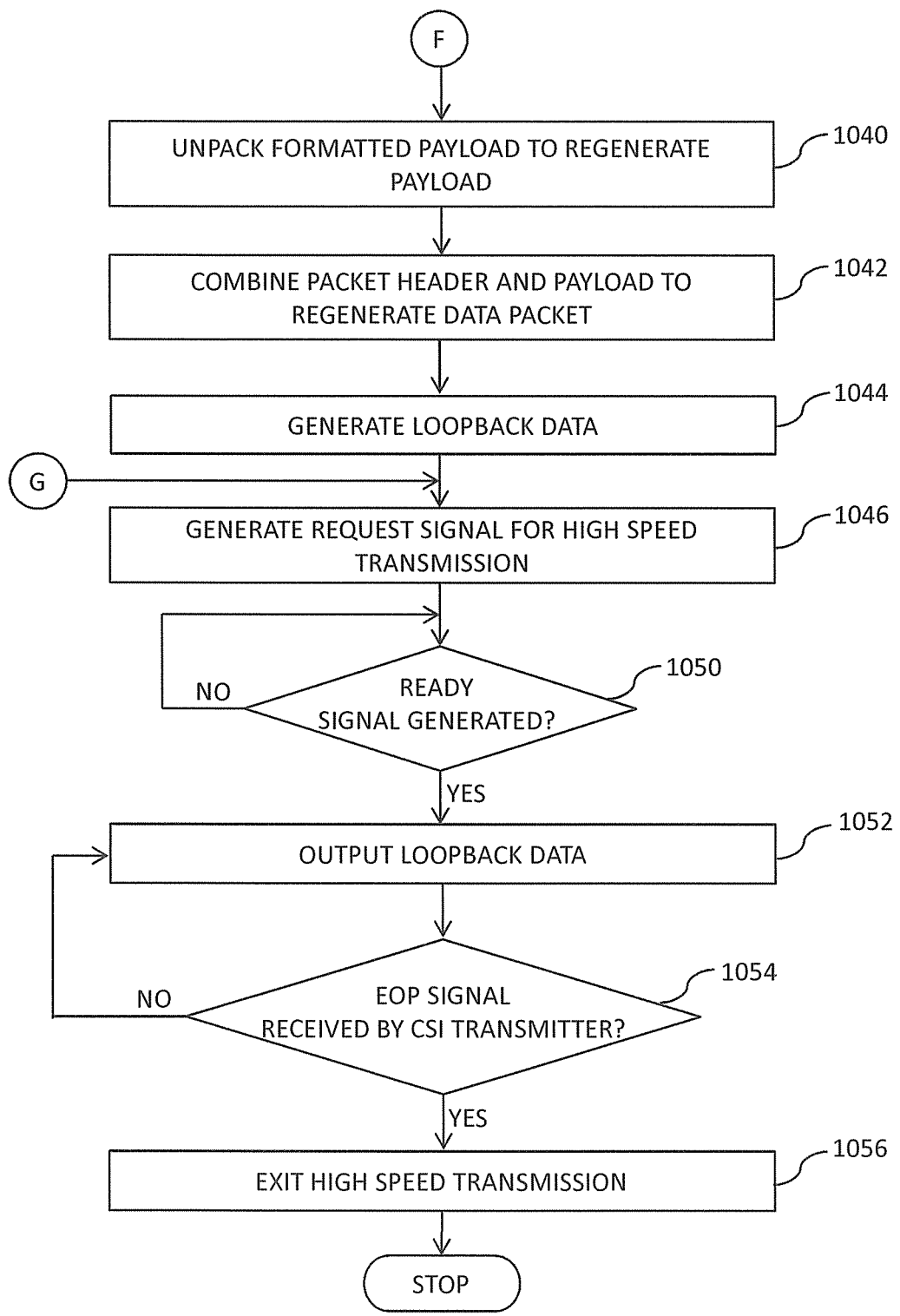

Referring now to FIG. 9, a timing diagram 900 illustrating an operation of the SoC 102, in accordance with an embodiment of the present invention, is shown. In this operation, the SoC 102 receives the first clock signal as first positive and negative clock signals ($CLK1_P$ and $CLK1_N$) over the first clock lane. The SoC 102 also receives the sensor data as first through third positive and negative input signals ($D1_{P0}$-$D1_{P2}$ and $D1_{N0}$-$D1_{N2}$) over first through third data lanes. The SoC 102 transmits the second clock signal as the second positive and negative clock signals ($CLK2_P$ and $CLK2_N$) of the second clock lane, and the loopback data as fourth through sixth positive and negative output signals ($D2_{P0}$-$D2_{P2}$ and $D2_{N0}$-$D2_{N2}$) over fourth through sixth data lanes. Based on the sensor data, the SoC 102 receives the $D1_{P0}$-$D1_{P2}$ and $D1_{N0}$-$D1_{N2}$ and transmits the $D2_{P0}$-$D2_{P2}$ and $D2_{N0}$-$D2_{N2}$.

At time $T_0$, the $D1_{P0}$-$D1_{P2}$ and $D1_{N0}$-$D1_{N2}$ are at logic high state, and $D2_{P0}$-$D2_{P2}$ and $D2_{N0}$-$D2_{N2}$ are at logic high state.

At time $T_1$, $D1_{P0}$-$D1_{P2}$ transition from high to low, $D1_{N0}$-$D1_{N2}$ remain high, and $D2_{P0}$-$D2_{P2}$ and $D2_{N0}$-$D2_{N2}$ also remain high.

At time $T_2$, $D1_{P0}$-$D1_{P2}$ remain low, $D1_{N0}$-$D1_{N2}$ transition from high to low, and $D2_{P0}$-$D2_{P2}$ and $D2_{N0}$-$D2_{N2}$ remain high.

At time $T_3$, $D1_{P0}$-$D1_{P2}$ and $D1_{N0}$-$D1_{N2}$ remain low, $D2_{P0}$-$D2_{P2}$ transition from high to low, and $D2_{N0}$-$D2_{N2}$ remain high.

At time $T_4$, $D1_{P0}$-$D1_{P2}$ remain low, $D1_{N0}$-$D1_{N2}$ transition from low to high, $D2_{P0}$-$D2_{P2}$ remain low, and $D2_{N0}$-$D2_{N2}$ transition from high to low.

At time $T_5$, $D1_{P0}$-$D1_{P2}$ transition from low to high, $D1_{N0}$-$D1_{N2}$ remain high, and $D2_{P0}$-$D2_{P2}$ and $D2_{N0}$-$D2_{N2}$ remain low.

At time $T_6$, $D1_{P0}$-$D1_{P2}$ remain high, $D1_{N0}$-$D1_{N2}$ transition high to low, $D2_{P0}$-$D2_{P2}$ remain low, and $D2_{N0}$-$D2_{N2}$ transition from low to high.

At time $T_7$, $D1_{P0}$-$D1_{P2}$ remain high, $D1_{N0}$-$D1_{N2}$ remain low, $D2_{P0}$-$D2_{P2}$ transition from low to high, and $D2_{N0}$-$D2_{N2}$ remain high.

At time $T_8$, $D1_{P0}$-$D1_{P2}$ remain high, $D1_{N0}$-$D1_{N2}$ transition from low to high, $D2_{P0}$-$D2_{P2}$ remain high, and $D2_{N0}$-$D2_{N2}$ transition from high to low.

At time $T_9$, $D1_{P0}$-$D1_{P2}$ transition from high to low, $D1_{N0}$-$D1_{N2}$ and $D2_{P0}$-$D2_{P2}$ remain high, and $D2_{N0}$-$D2_{N2}$ remain low.

At time $T_{10}$, $D1_{P0}$-$D1_{P2}$ remain low, $D1_{N0}$-$D1_{N2}$ and $D2_{P0}$-$D2_{P2}$ remain high, and $D2_{N0}$-$D2_{N2}$ transition from low to high.

At time $T_{11}$, $D1_{P0}$-$D1_{P2}$ remain low, $D1_{N0}$-$D1_{N2}$ remain high, $D2_{P0}$-$D2_{P2}$ remain high, and $D2_{N0}$-$D2_{N2}$ remain high.

At time $T_{12}$, $D1_{P0}$-$D1_{P2}$ remain low, $D1_{N0}$-$D1_{N2}$ transition from high to low, $D2_{P0}$-$D2_{P2}$ remain high, and $D2_{N0}$-$D2_{N2}$ remain high.

At time $T_{13}$, $D1_{P0}$-$D1_{P2}$ remain low, $D1_{N0}$-$D1_{N2}$ remain low, $D2_{P0}$-$D2_{P2}$ remain high, and $D2_{N0}$-$D2_{N2}$ remain high.

At time $T_{14}$, $D1_{P0}$-$D1_{P2}$ remain at low, $D1_{N0}$-$D1_{N2}$ transition from low to high, $D2_{P0}$-$D2_{P2}$ remain high, and $D2_{N0}$-$D2_{N2}$ remain at high.

At time $T_{15}$, $D1_{P0}$-$D1_{P2}$ remain low, $D1_{N0}$-$D1_{N2}$ remain high, $D2_{P0}$-$D2_{P2}$ transition from high to low, and $D2_{N0}$-$D2_{N2}$ remain high.

At time $T_{16}$, $D1_{P0}$-$D1_{P2}$ remain low, $D1_{N0}$-$D1_{N2}$ remain high, $D2_{P0}$-$D2_{P2}$ remain low, and $D2_{N0}$-$D2_{N2}$ transition from high to low.

At time $T_{17}$, $D1_{P0}$-$D1_{P2}$ remain at low, $D1_{N0}$-$D1_{N2}$ remain high, $D2_{P0}$-$D2_{P2}$ remain low. The $D2_{N0}$-$D2_{N2}$ remain low.

At time $T_{18}$, $D1_{P0}$-$D1_{P2}$ remain low, $D1_{N0}$-$D1_{N2}$ remain high, $D2_{P0}$-$D2_{P2}$ remain low, and $D2_{N0}$-$D2_{N2}$ transition from low to high.

At time $T_{19}$, $D1_{P0}$-$D1_{P2}$ remain low, $D1_{N0}$-$D1_{N2}$ remain high, $D2_{P0}$-$D2_{P2}$ remain low, and $D2_{N0}$-$D2_{N2}$ remain high.

Referring now to FIGS. 10A-10F, a flowchart 1000 illustrating a method for data transfer on the SoC 102, in accordance with an embodiment of the present invention, is shown.

At step 1002, the CSI receiver 108 receives the sensor data and the first clock signal from the external camera sensor 104, i.e., the first DPHY 202 receives the sensor data and the first clock signal. At step 1004, the first DPHY 202 generates the active, valid, and sync signals based on the sensor data.

At step 1006, the first CSI controller 204 generates the data packet based on the sensor data received from the first DPHY 202. At step 1008, the first CSI controller 204 performs error correction on the data packet to generate the error signal.

At step 1010, the first CSI controller 204 separates the packet header and the payload of the data packet and steps 1012 and 1014 are executed. At step 1012, the system memory write interface 208 writes the payload into the primary system memory 114. At step 1014, the first pipeline controller 212 decodes the type of the data packet based on the packet header. The first pipeline controller 212 receives the data packet from the error handler 210. At step 1016, the first pipeline controller 212 determines if the data packet is a long packet. If at step 1016, the first pipeline controller 212 determines that the data packet is a long packet, step 1018 is executed.

At step 1018, the packet header of the data packet is communicated by the CSI receiver 108 to the CSI transmitter 112 over the command FIFO read interface. The first pipeline controller 212 writes the packet header of the long data packet into the first buffer 214. The first buffer 214 communicates the packet header of the long packet to the header read controller 310 of the CSI transmitter 112. At step 1020, the data formatter 216 packs the payload received from the error handler 210 to generate the formatted payload, and steps 1022 and 1024 are executed. The data formatter 216 writes the formatted payload into the second buffer 218.

At step 1022, the formatted payload is written into the loopback buffer 110 by the second buffer 218 and step 1026 is executed. At step 1026, the header read controller 310 of the CSI transmitter 112 reads the packet header of the data packet from the first buffer 214. At step 1028, the header read controller 310 identifies the size of the payload from the packet header and step 1032 is executed.

At step 1024, the data formatter 216 determines if the data packet is complete. If at step 1024, the data formatter 216 determines that the data packet is complete, step 1030 is executed. At step 1030, the CSI receiver 108 communicates the EOP signal to the CSI transmitter 112 and step 1032 is executed. However, if at step 1024, the data formatter 216 determines that the data packet is incomplete, step 1020 is executed.

At step 1032, the CSI transmitter 112 determines if the payload is received completely by the loopback buffer 110. If at step 1032, the CSI transmitter 112 determines that the payload is not received completely by the loopback buffer 110, step 1034 is executed.

At step 1034, the CSI transmitter 112 determines if the loopback buffer 110 is filled up to the threshold capacity. If at step 1034, the CSI transmitter 112 determines that the loopback buffer 110 is not filled up to the threshold capacity, step 1032 is executed. However, if at step 1034, the loopback buffer 110 determines that the loopback buffer 110 is filled up to the threshold capacity, step 1036 is executed. If at step 1032, the CSI transmitter 112 determines that the payload is received completely by the loopback buffer 110, step 1036 is executed.

At step 1036, the second pipeline controller 312 of the CSI transmitter 112 generates a read control signal. The second pipeline controller 312 receives the packet header of the data packet from the header read controller 310. The second pipeline controller 312 identifies the format of the payload and generates the read control signal.

At step 1038, the data read controller 314 reads the formatted payload from the loopback buffer 110. The data read controller 314 further provides the formatted payload to the data un-formatter 316. At step 1040, the data un-formatter 316 unpacks the formatted payload to regenerate the payload. The data formatter 216 provides the regenerated payload to the second CSI controller 304.

At step 1042, the second CSI controller 304 combines the packet header and the payload to regenerate the data packet. At step 1044, the second CSI controller 304 generates the loopback data based on the data packet and step 1046 is performed. At step 1046, the second CSI controller 304 generates the request signal for high speed transmission of the loopback data and step 1050 is executed. The second CSI controller 304 provides the request signal to the second DPHY 308 for requesting high speed transmission of the loopback data.

At step 1016, if the first pipeline controller 212 determines that the data packet is not a long packet, i.e., the data packet is a short packet, step 1048 is executed. At step 1048, the first buffer 214 communicates the packet header of the data packet to the header read controller 310 and step 1046 is executed. The first buffer 214 receives the packet header of the data packet from the first pipeline controller 212.

At step 1050, the second CSI controller 304 determines if the ready signal is generated by the second DPHY 308. The second DPHY 308 generates the ready signal in response to the request signal. If at step 1050, the second CSI controller 304 determines that the ready signal is generated by the second DPHY 308, step 1052 is executed. However, if at step 1050, the second CSI controller 304 determines that the ready signal is not generated by the second DPHY 308, the second CSI controller 304 waits for the generation of the ready signal.

At step 1052, the CSI transmitter 112 outputs the loopback data. The second CSI controller 304 transmits the loopback data to the second DPHY 308 in response to the ready signal. The second DPHY 308 further transmits the loopback data to the processor 106. At step 1054, the CSI transmitter 112 determines if it has received the EOP signal from the CSI receiver 108. If at step 1054, the CSI transmitter 112 determines that it has received the EOP signal from the CSI receiver 108, step 1056 is executed. However, if at step 1054, the CSI transmitter 112 determines that it has not received the EOP signal from the CSI receiver 108, step 1052 is executed. At step 1056, the second CSI controller 304 exits the high-speed transmission of the loopback data.

It will be apparent to a person having ordinary skill in the art that aforementioned method for data transfer on the SoC 102 may be performed for multiple data packets generated by the CSI receiver 108 based on the received sensor data in real-time. The multiple data packets are regenerated by the CSI transmitter 112 in real-time.

The system 100 enables the transfer of the payload in real-time by way of the loopback buffer 110 from the CSI receiver 108 to the CSI transmitter 112. Thus, the primary system memory 114 is not used for the data transfer between the CSI receiver 108 and the CSI transmitter 112. Further, as the sensor data and the loopback data are in the same format, the need to convert the loopback data to a format of the sensor data is eliminated. Additionally, delays in the system 100 are reduced as there is no need to convert the format of the loopback data. The system 100 further compensates for frequency offset of the ppm differences between the first and second clock frequencies by transmitting the payload from the CSI receiver 108 to the CSI transmitter 112 through the loopback buffer 110.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:
1. A system-on-chip (SoC) having two or more high-speed serial interfaces, the SoC comprising:

a camera serial interface (CSI) receiver that receives sensor data via a first serial interface and generates a data packet that includes a payload and packet header;

a loopback buffer connected to the CSI receiver, wherein the CSI receiver writes the payload into the loopback buffer, the CSI receiver comprises a first digital physical layer (DPHY) connected to an external camera sensor by way of the first serial interface for receiving the sensor data and a first clock signal, wherein the first DPHY outputs the sensor data, and generates active, sync, and valid signals, the active signal is generated in response to the first DPHY being ready to transmit the sensor data, the sync signal is generated to synchronize a transmission frequency of the sensor data with a frequency of the first clock signal, and the valid signal is generated in response to the sensor data is valid;

a first CSI controller connected to the first DPHY for receiving the sensor data and the active, sync, and valid signals, wherein the first CSI controller (i) generates the data packet, (ii) separates the payload and the packet header, (iii) outputs the payload and the packet header, (iv) performs error correction on the data packet to generate an error signal, and (v) generates an end of packet (EOP) signal, the error signal indicates an error in the data packet, and the EOP signal indicates an end of the data packet; and a first loopback controller connected to the first CSI controller for receiving the packet header, the payload, the EOP signal, and the error signal, wherein the first loopback controller (i) decodes a type of the data packet from the packet header, (ii) packs the payload to generate a formatted payload, and (iii) communicates the packet header and the EOP signal to the CSI transmitter, and the payload written by the CSI receiver into the loopback buffer is the formatted payload; and a CSI transmitter connected between a second serial interface and the loopback buffer, wherein the CSI transmitter reads the payload from the loopback buffer in response to at least one of a threshold capacity of the loopback buffer is reached and the payload is received completely by the loopback buffer, and transmits the read payload over the second serial interface.

2. The SoC of claim 1, wherein the threshold capacity is based on a depth of the loopback buffer.

3. The SoC of claim 1, wherein the first loopback controller comprises:

an error handler connected to the first CSI controller for receiving the packet header, the payload, the EOP signal, and the error signal, and outputting the packet header, the EOP signal, and the payload, wherein the error handler outputs the packet header and the payload in response to the error signal indicating that the data packet does not include an error;

a first pipeline controller connected to the error handler for receiving the packet header and the EOP signal, wherein the first pipeline controller (i) decodes the type of the data packet from the packet header, (ii) outputs the packet header and the EOP signal, and (iii) generates a write control signal, and the first pipeline controller receives the EOP signal from the error handler in response to the error handler receiving the complete payload;

a first buffer connected to the first pipeline controller for receiving the packet header and the EOP signal, wherein the first buffer provides the packet header and the EOP signal to the CSI transmitter;

a data formatter connected to the error handler and the first pipeline controller for receiving the payload and the write control signal, respectively, wherein the data formatter packs the payload based on the write control signal to generate the formatted payload in response to the type of the data packet being a long packet;

a second buffer connected to the data formatter for receiving the formatted payload, wherein the second buffer writes the formatted payload to the loopback buffer.

4. The SoC of claim 3, wherein the CSI transmitter comprises:

a second loopback controller connected to the first loopback controller for reading the packet header, and receiving the EOP signal, wherein the second loopback controller also is connected to the loopback buffer for receiving the formatted payload, wherein the second loopback controller (i) unpacks the formatted payload to regenerate the payload and (ii) output the packet header;

a second CSI controller connected to the second loopback controller for receiving the packet header and the payload, wherein the second CSI controller combines the packet header and the payload to regenerate the data packet and generates loopback data and a request signal for requesting high speed transmission of the loopback data, wherein a format of the loopback data is the same as a format of the sensor data;

a second DPHY that receives a second clock signal, and is connected to the second CSI controller for receiving the request signal and the loopback data, wherein the second DPHY transmits a ready signal to the second CSI controller and the second CSI controller provides the loopback data to the second DPHY in response to the ready signal, and then the second DPHY outputs the loopback data over the second serial interface; and a phase locked loop (PLL) connected to the second DPHY for providing the second clock signal to the second DPHY, wherein a frequency of the second clock signal is equal to the frequency of the first clock signal.

5. The SoC of claim 4, wherein the second loopback controller comprises:

a header read controller connected to the first buffer for reading the packet header and receiving the EOP signal, wherein the header read controller (i) identifies a size of the payload and (ii) outputs the packet header and payload size information;

a second pipeline controller that receives a status signal, and is connected to the header read controller for receiving the packet header, wherein the second pipeline controller generates a read control signal;

a data read controller connected to the header read controller, the second pipeline controller, and the loopback buffer for receiving the payload size information, the read control signal, and the formatted payload, respectively, and outputting the formatted payload, wherein the data read controller reads the formatted payload from the loopback buffer based on the size information and the read control signal; and a data un-formatter connected to the data read controller for receiving the formatted payload, wherein the data un-formatter (i) unpacks the formatted payload to regenerate the payload and (ii) generates the status signal, wherein the status signal indicates a status of unpacking the payload by the data un-formatter.

6. The SoC of claim 1, further comprising a primary system memory connected to the CSI receiver, wherein the CSI receiver writes the payload into the primary system memory.

7. The SoC of claim 6, wherein the CSI receiver further comprises a system memory write interface connected to the first CSI controller for receiving the packet header, the payload, the EOP signal, and the error signal, wherein the CSI receiver writes the payload into the primary system memory.

8. A method for data transfer in a system-on-chip (SoC) that includes a camera serial interface (CSI) receiver connected to a first high-speed serial interface (HSSI), a loopback buffer, and a CSI transmitter connected to a second high-speed serial interface (HSSI), the method comprising:
generating, by the CSI receiver, a data packet from data received over the first HSSI, wherein the data packet includes a payload and packet header;
writing, by the CSI receiver, the payload into the loopback buffer;
reading, by the CSI transmitter, the payload from the loopback buffer in response to at least one of a threshold capacity of the loopback buffer being reached and the payload being received completely by the loopback buffer, and transmitting the payload over the second HSSI;
generating, by the CSI receiver, valid and sync signals, wherein the sync signal is generated to synchronize a transmission frequency of the sensor data with a frequency of the first clock signal, and the valid signal is generated in response to the sensor data being valid;
performing, by the CSI receiver, error correction on the data packet;
separating, by the CSI receiver, the packet header and the payload of the data packet;
writing, by the CSI receiver, the payload into the loopback buffer; and
transmitting, by the CSI receiver, the packet header to the CSI transmitter.

9. The method of claim 8, wherein the threshold capacity is based on a depth of the loopback buffer.

10. The method of claim 8, wherein the steps of writing the payload and transmitting the packet header further comprise:
decoding, by the CSI receiver, a type of the data packet from the packet header;
packing, by the CSI receiver, the payload to generate a formatted payload in response to the type of the data packet being a long packet, wherein the payload written by the CSI receiver into the loopback buffer is the formatted payload; and
communicating, by the CSI receiver, an end of packet (EOP) signal to the CSI transmitter, wherein the EOP signal indicates an end of the data packet.

11. The method of claim 10, further comprising:
receiving, by the CSI transmitter, the packet header;
reading, by the CSI transmitter, the formatted payload from the loopback buffer;
regenerating, by the CSI transmitter, the payload;
combining, by the CSI transmitter, the regenerated payload and the packet header to regenerate the data packet;
generating, by the CSI transmitter, loopback data and a request signal for requesting high speed transmission of the loopback data, wherein the loopback data has the same format as the sensor data;
generating, by the CSI transmitter, a ready signal in response to the request signal; and
outputting the loopback data over the second HSSI by the CSI transmitter.

12. The method of claim 11, wherein the step of regenerating the payload further comprises:
identifying, by the CSI transmitter, a size of the payload;
generating, by the CSI transmitter, a read control signal;
reading, by the CSI transmitter, the formatted payload from the loopback buffer based on the size of the payload and the read control signal; and
unpacking, by the CSI transmitter, the formatted payload to regenerate the payload.

13. The method of claim 8, further comprising:
writing, by the CSI receiver, the payload into a primary system memory of the SoC.

* * * * *